United States Patent [19]
Smith

[11] Patent Number: 5,657,953
[45] Date of Patent: Aug. 19, 1997

[54] OPERABLE HANGER

[76] Inventor: Harold C. Smith, 1101 Birchcrest Rd., Bellevue, Nebr. 68005

[21] Appl. No.: 580,769

[22] Filed: Dec. 29, 1995

[51] Int. Cl.$^6$ ........................................ F16M 11/00
[52] U.S. Cl. ............... 248/217.1; 248/217.2; 248/218.1; 248/317; 248/218.3
[58] Field of Search ............ 248/217.1, 217.2, 248/218.1, 218.3, 317, 320

[56] References Cited

U.S. PATENT DOCUMENTS

| | | | |
|---|---|---|---|
| 55,611 | 6/1866 | Bullock | 248/218.3 X |
| 2,201,138 | 5/1940 | Hyde | 248/217.2 |
| 3,043,546 | 7/1962 | Reich | 248/215 |
| 3,343,773 | 9/1967 | Lorenz | 248/217.2 |
| 3,517,417 | 6/1970 | Kachel | 248/218.3 X |
| 3,612,459 | 10/1971 | Walls | 248/215 |
| 3,632,152 | 1/1972 | Renfroe | 294/85 |
| 4,195,873 | 4/1980 | Johnston | 294/106 |
| 4,221,419 | 9/1980 | Riley et al. | 294/106 |
| 4,238,098 | 12/1980 | Siegfried et al. | 248/217.2 |
| 4,371,203 | 2/1983 | Munro | 294/86 R |
| 4,667,913 | 5/1987 | Peelle et al. | 248/317 X |
| 4,799,639 | 1/1989 | Riley | 248/228 |
| 4,966,344 | 10/1990 | Gary | 248/317 |
| 5,074,419 | 12/1991 | Smith | 211/17 |
| 5,312,079 | 5/1994 | Little, Jr. | 248/230 |

FOREIGN PATENT DOCUMENTS 862588   1/1953   Germany ................. 248/228.4

*Primary Examiner*—Leslie A. Braun
*Assistant Examiner*—Richard M. Smith
*Attorney, Agent, or Firm*—Zarley, McKee, Thomte, Voorhees & Sease; Mark D. Frederiksen

[57] ABSTRACT

An operable hanger includes a pair of legs connected at their lower ends and generally symmetrically oriented about a vertical central axis. Horizontally oriented tips at the upper ends of the legs will selectively engage a support structure by movement towards one another. A slide bar mounted on the legs is vertically movable to bias the leg tips towards one another when moved downwardly and bias the leg tips away from one another when moved upwardly. A support hook is attached to the slide bar by a chain to support a bird feeder or other object below the hanger.

14 Claims, 3 Drawing Sheets

OPERABLE HANGER

TECHNICAL FIELD

The present invention relates generally to hooks and hangers, and more particularly to an improved operable hanger which may be removably mounted to an overhead rafter or tree limb for supporting hanging plants, bird feeders and the like.

BACKGROUND OF THE INVENTION

With the popularity of bird watching booming, the hanging of bird feeders in convenient locations has become important to the consumer. Because bird feeders must be frequently removed or attended to in order to replace seed in the feeder, it is desirable to provide a feeder which may be easily and conveniently removed from its support.

Conventionally, a bird feeder is hung by wire from a tree branch, or from a hook threaded into the eaves of a roof overhang. Both of these conventional arrangements are inconvenient to remove from the support structure. In addition, a single support hook typically must be utilized in a specific support structure and cannot be easily moved from one support structure to another.

SUMMARY OF THE INVENTION

It is therefore a general object of the present invention to provide an improved operable hanger for supporting bird feeders and the like from overhead beams, tree branches, and other support structures.

Yet another object is to provide an operable hanger which may be used on a wide variety of support structures.

A further object of the present invention is to provide an operable hanger which may be easily removed and attached from a support structure.

These and other objects of the present invention will be apparent to those skilled in the art.

The operable hanger of the present invention includes a pair of legs connected at their lower ends and generally symmetrically oriented about a vertical central axis. Horizontally oriented tips at the upper ends of the legs will selectively engage a support structure by movement towards one another. A slide bar mounted on the legs is vertically movable to bias the leg tips towards one another when moved downwardly and bias the leg tips away from one another when moved upwardly. A support hook is attached to the slide bar by a chain to support a bird feeder or other object below the hanger.

DESCRIPTION OF THE PREFERRED EMBODIMENT

Figure 1:
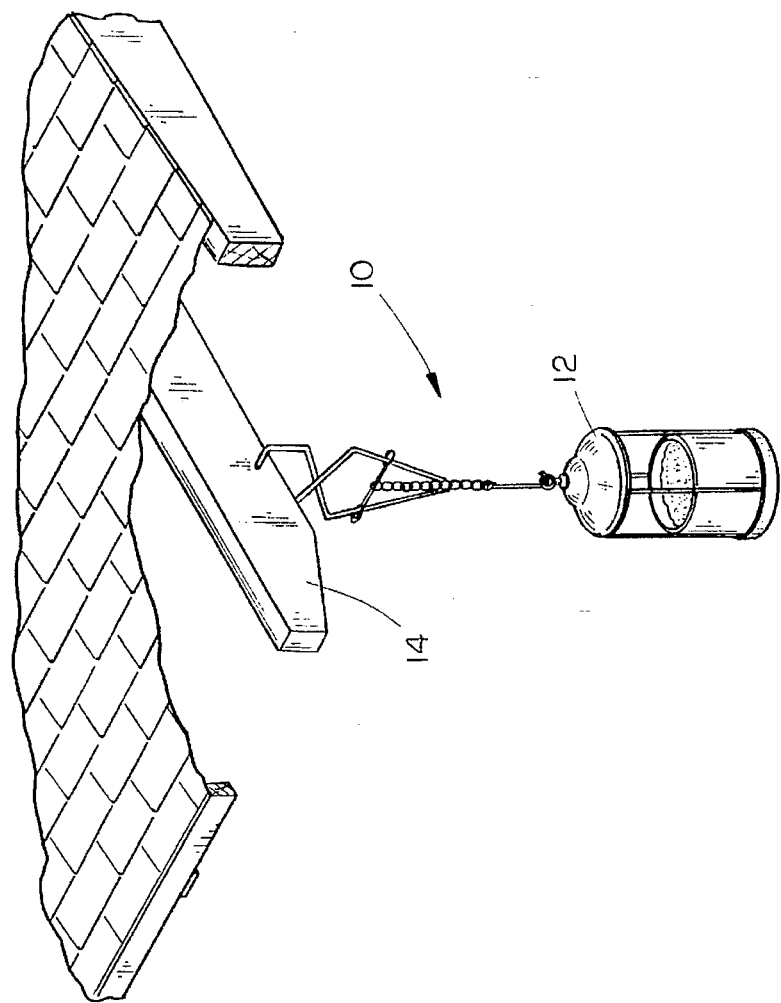
FIG. 1 is a perspective view of the present invention attached to an overhead beam and supporting a bird feeder.

Referring now to the drawings, in which similar or corresponding parts are identified with the same reference numeral, and more particularly to FIG. 1, the operable hanger of the present invention is designated generally at 10 and is shown supporting a bird feeder 12 from a rafter 14.

Figure 2:
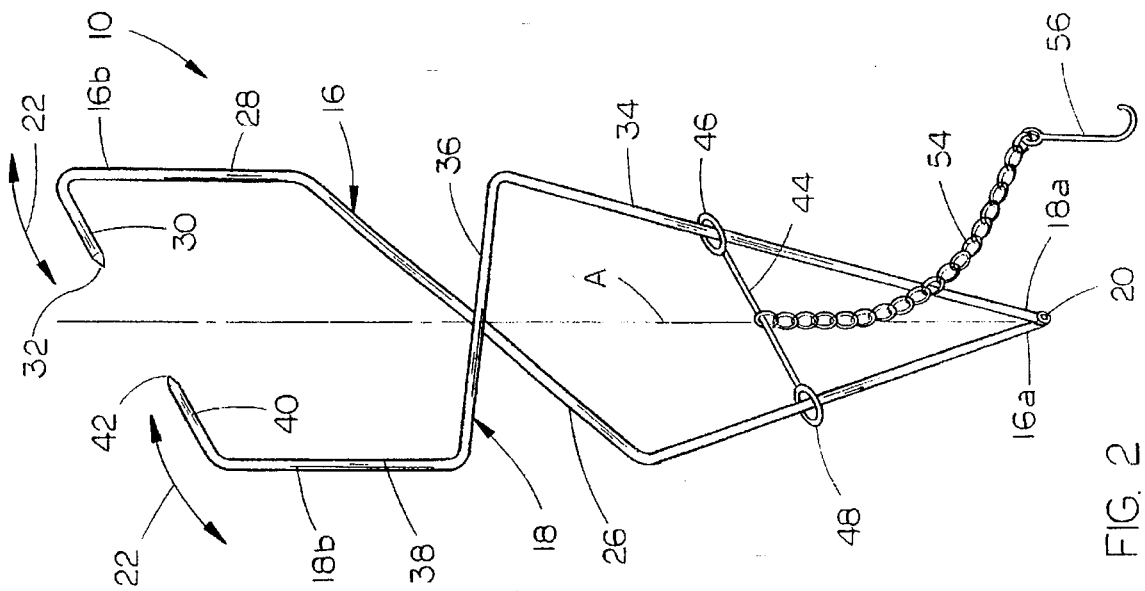
FIG. 2 is an enlarged perspective view of the hanger of the present invention.

Referring now to FIG. 2, hanger 10 includes a pair of legs, designated generally at 16 and 18 which are operably connected at lower ends 16a and 18a respectively. In the first embodiment of the invention shown in FIG. 2, legs 16 and 18 are pivotally connected by a hinge 20 such that the upper ends 16b and 18b will pivot towards one another in an inward direction, or away from one another in an outward direction, as shown by arrows 22. A vertical axis A extending through hinge 20 extends vertically and centrally between legs 16 and 18.

Leg 16 includes a lower portion 24 extending upwardly from lower end 16a and outwardly from axis A. A central portion 26 of leg 16 extends from the upper end of lower portion 24 upwardly and inwardly so as to cross axis A and project outwardly in the opposite direction. An upper portion 28 of leg 16 projects vertically upwardly from the upper end of central portion 26 to the upper end 16b of leg 16. A generally horizontal tip 30 extends inwardly from the upper end of leg 16 upper portion 28 to a sharp point 32 which will engage a rafter or other material. Leg 18 includes a lower portion 34, central portion 36, upper portion 38, tip 40 and point 42, all of which are symmetric with the same portions of leg 16 about axis A. Thus, lower portion 34 of leg 18 projects outwardly from axis A in the opposite direction of lower portion 24 of leg 116. Since both legs 26 and 36 cross axis A, they will also cross axis A at a point where they cross each other. Upper portions 28 and 38 of legs 16 and 18 will be generally parallel, while points 32 and 42 on tips 30 and 40 will be generally coaxial and will pivot towards and away from one another about hinge 20.

A slide bar 44 is an elongated rigid bar having rings 46 and 48 at opposing ends which are slidably mounted on leg lower portions 34 and 24 respectively.

Figure 4:
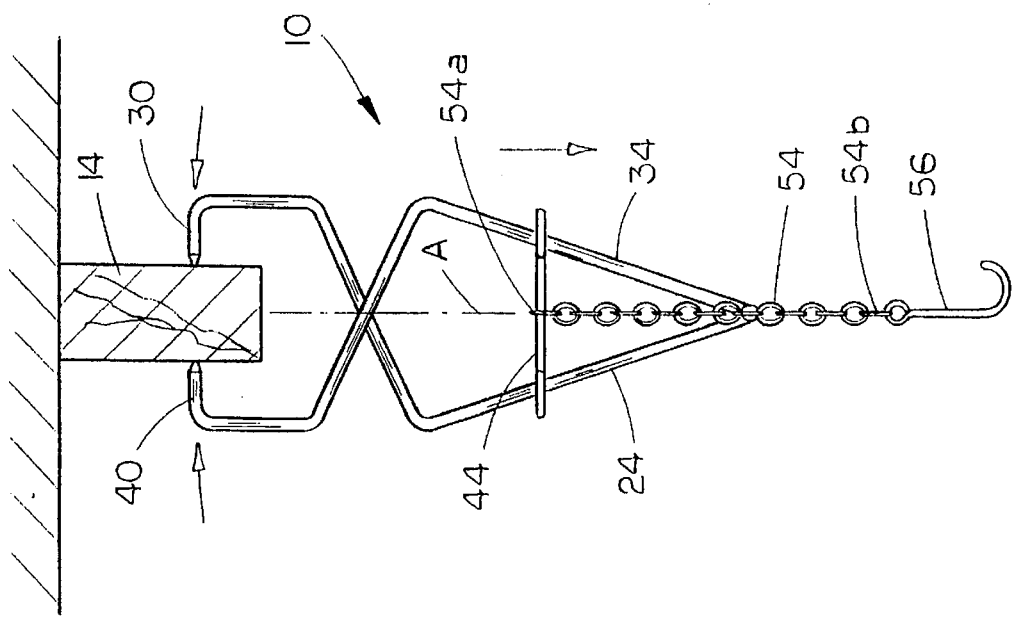
FIG. 4 is an elevational view similar to FIG. 3, but after the hanger has engaged a rafter.
Figure 3:
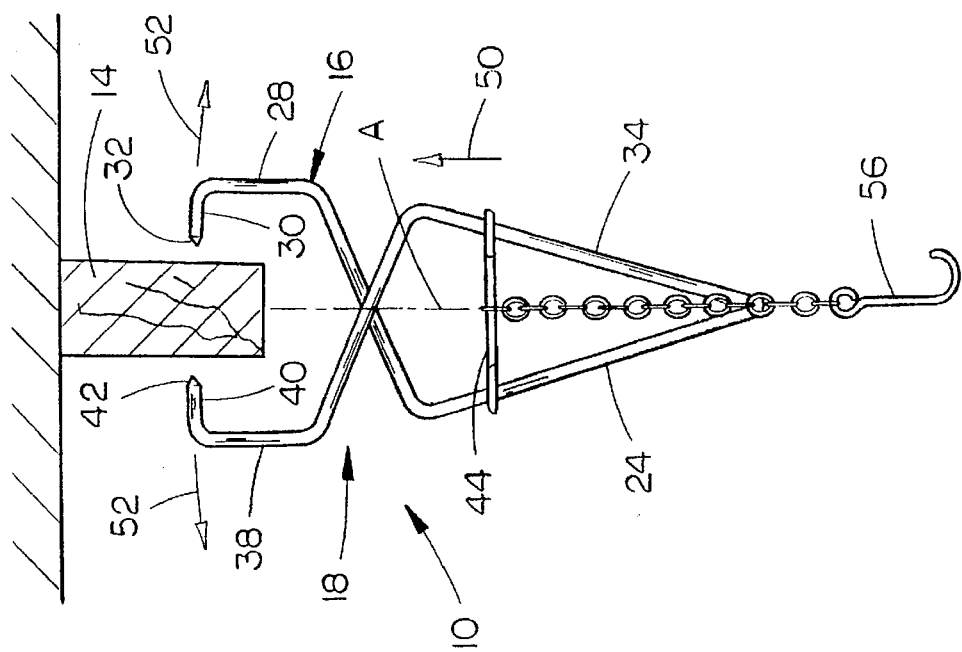
FIG. 3 is an elevational view of the invention prior to engagement with a rafter.
Figure 7:
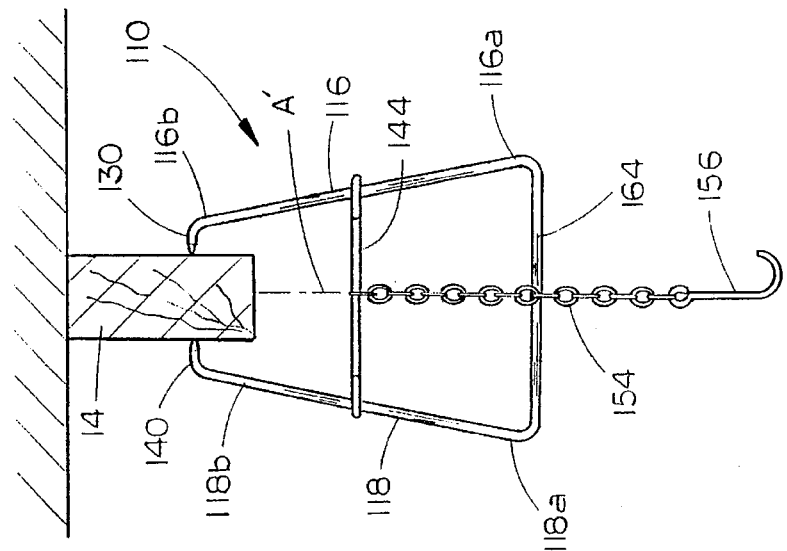
FIG. 7 is an elevational view of a fourth embodiment of the invention.

As shown in FIG. 3, movement of slide bar 44 upwardly (arrow 50) will cause leg lower portions 24 and 34 to be pivoted towards one another, thereby pivoting leg upper portions 28 and 38 away from one another, as shown by arrows 52. Thus, upward movement of slide bar 44 will disengage points 32 and 42 on tips 30 and 40 from rafter 14 to permit removal of hanger 10 therefrom. Movement of slide bar 44 downwardly, as shown in FIG. 4, has the opposite effect, forcing tips 30 and 40 towards one another into engagement with rafter 14, to secure hanger 10 in position.

A chain 54 has an upper end 54a affixed centrally along slide bar 44. A hook 56 is attached to the lower end 54b of chain 54, for supporting a bird feeder or other item. Because of the action of slide bar 44, it can be seen that the addition of any weight to hook 56 will cause tips 30 and 40 to be forced inwardly and thereby more securely fasten hanger 10 to rafter 14.

Figure 5:
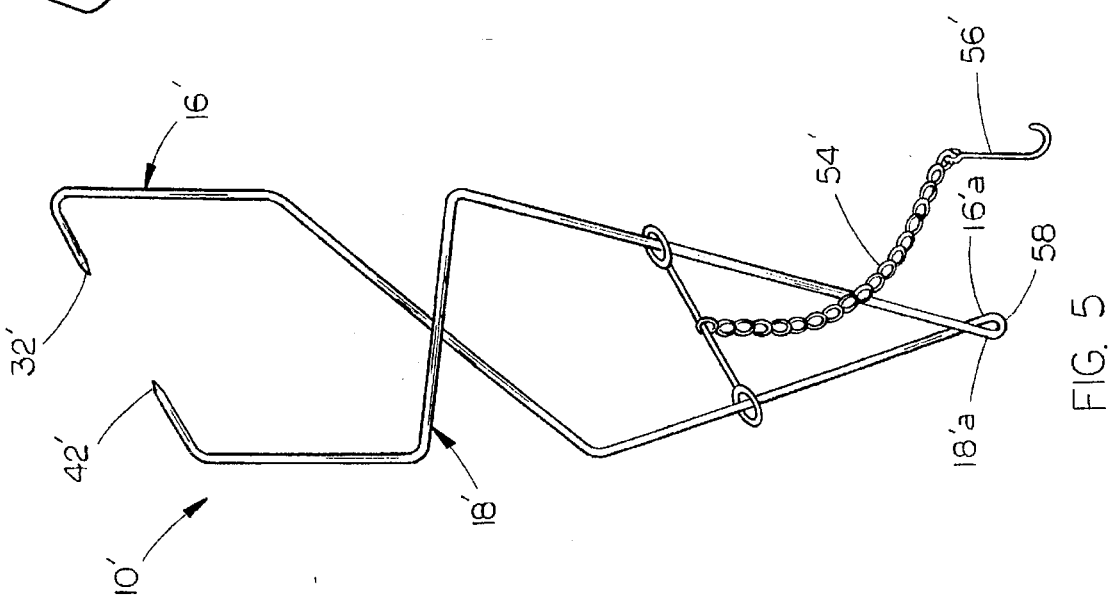
FIG. 5 is a perspective view of a second embodiment of the invention.

Referring now to FIG. 5, a second embodiment of the hanger is identified generally at 10' and includes the same general shape of legs 16' and 18'. However, the connection of the lower ends 16'a with 18'a is with a loop 58 of the same spring wire or other resilient material as legs 16' and 18'. In this way, legs 16' and 18' will still pivot about loop 58, but the pivotal movement is by virtue of flexing of the legs 16' and 18', rather than mechanical pivoting action on a hinge.

Loop 58 may also provide a biasing force to legs 16' and 18', which biases the legs to an original position with tips 32' and 42' spaced a predetermined distance apart. This biasing force assists the user in attaching the hanger 10, by applying a force for a weight as attached to chain 54.

Figure 6:
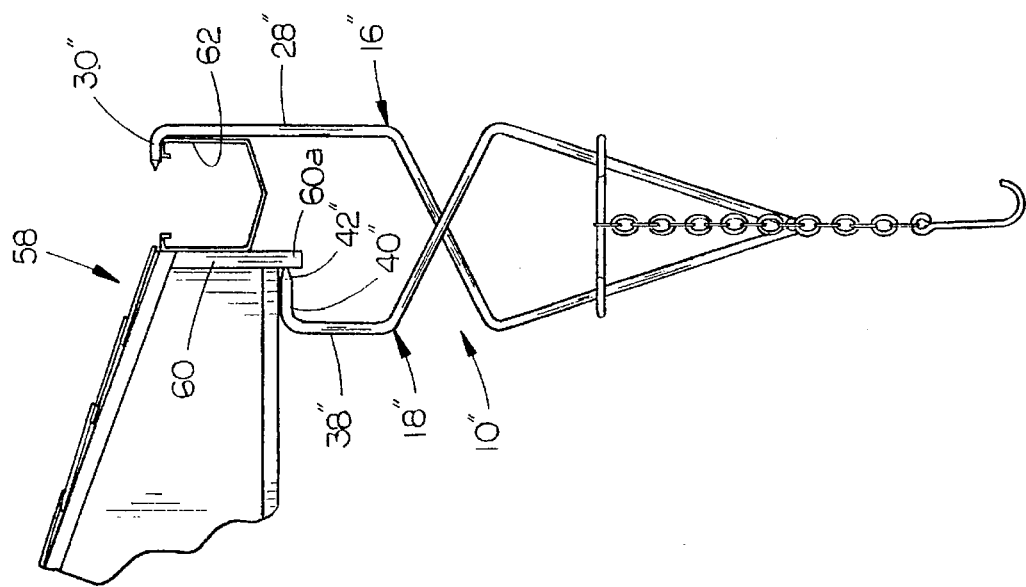
FIG. 6 is an elevational view of a third embodiment of the invention.

Referring now to FIG. 6, a third embodiment of the hanger is designated generally at 10" and is identical to the first embodiment of hanger 10 except for the length of leg 16" upper portion 28". In this embodiment, hanger 10" has one leg upper portion 28" longer than the opposing leg upper portion 38". This permits attachment of hanger 10" to a support structure 58 which has locations for leverage which are located at different vertical distances. For example, the depending end 60a of a fascia board 60 may serve to engage point 42" on tip 40", but the thickness of fascia board 60 is not conducive to retaining a heavy weight. In this example, leg upper portion 28" has a length which locates tip 30" over the upper edge of a gutter 62.

A fourth embodiment of the hanger is designated generally at 110 and includes a pair of legs 116 and 118 connected together at their lower ends 116a and 118a by horizontal arm 164. The upper ends 116b and 118b have generally horizontally oriented tips 130 and 140 respectively directed inwardly towards one another opposing sides of a vertical axis A' bisecting arm 164 and located centrally between legs 116 and 118.

Hanger 110 is preferably formed of a single length of resilient but rigid material such as plastic or metal, with legs 116 and 118 bent upwardly from opposing ends of arm 164. Legs 116 and 118 extend vertically upwardly, and project inwardly towards axis A' from their lower ends to their upper ends. A slide bar 144 identical to that of hanger 10 is slidably mounted on legs 116 and 118 such that vertical movement of slide bar 144 moves tips 130 and 140 inwardly during downward movement and outwardly during upward movement. In this way, weight applied to hook 156 on chain 154 will cause slide bar 144 to move downwardly such that tips 130 and 140 engage a rafter 14 or other similar support structure.

Whereas the invention has been shown and described in connection with the preferred embodiment thereof, many modifications, substitutions and additions may made which are within the intended broad scope of the appended claims. For example, the hanger may be applied to a tree trunk or tree limb, with the inwardly directed tips of the hanger directed over the top of the limb rather than into the sides of the limit. Similarly, cable, or other similar material may be utilized in place of chain to support a feeder on the slide bar of the hanger.

I claim:

1. An operable hanger, comprising:
   a pair of generally vertically oriented first and second legs, said legs operably connected together at lower ends on opposing sides of a vertically oriented central axis;
   each leg upper end having a generally horizontally oriented tip projecting inwardly towards the central axis;
   a slide bar operably mounted to said legs for biasing the tips inwardly as the bar is moved downwardly along the legs, and to bias the tips outwardly as the bar is moved upwardly along the legs; and
   means connected to said slide bar for supporting an object above the ground; said legs including lower portions extending upwardly and outwardly away from one another from the connection at the lower ends;
   said legs including central portions crossing one another along the central axis and projecting outwardly in opposite directions at upper ends of the central portions, and
   said legs including upper portions projecting upwardly generally parallel to one another, said leg tips projecting inwardly from upper ends of the upper portions, and
   said slide bar operably mounted on said leg lower portion.

2. The hanger of claim 1, wherein said tips are oriented generally coaxially.

3. The hanger of claim 1, wherein the lower ends of said legs are pivotally connected at a hinge.

4. The hanger of claim 1, wherein the lower ends of said legs are rigidly connected together by a loop of resilient material.

5. The hanger of claim 1, wherein said legs are connected by a generally horizontally oriented arm, said legs projecting upwardly and inwardly towards one another from their lower ends to their upper ends.

6. The hanger of claim 1, wherein each said tip includes a sharpened point at the projecting ends thereof.

7. The hanger of claim 1, wherein one leg is longer than the other leg such that the tips are vertically spaced apart.

8. An operable hanger, comprising:
   a pair of generally vertically oriented first and second legs, said legs operably connected together at lower ends on opposing sides of a vertically oriented central axis;
   each leg upper end having a generally horizontally oriented tip projecting inwardly towards the central axis;
   a slide bar means operably mounted to said legs for biasing the tips inwardly as the bar is moved downwardly along the legs, and to bias the tips outwardly as the bar is moved upwardly along the legs;
   said slide bar including an elongated rigid member having a ring affixed to each end, one leg of the hanger being journaled through each ring of the slide bar; and means connected to said slide bar for supporting an object above the ground.

9. The hanger of claim 8, wherein said tips are oriented generally coaxially.

10. The hanger of claim 8, wherein the lower ends of said legs are pivotally connected at a hinge.

11. The hanger of claim 8, wherein the lower ends of said legs are rigidly connected together by a loop of resilient material.

12. The hanger of claim 8, wherein said legs are connected by a generally horizontally oriented arm, said legs projecting upwardly and inwardly towards one another from their lower ends to their upper ends.

13. The hanger of claim 8, wherein each said tip includes a sharpened point at the projecting ends thereof.

14. The hanger of claim 8, wherein one leg is longer than the other leg such that the tips are vertically spaced apart.

* * * * *